United States Patent [19]
Ovshinsky et al.

[11] Patent Number: 5,376,475
[45] Date of Patent: Dec. 27, 1994

[54] AQUEOUS LITHIUM-HYDROGEN ION RECHARGEABLE BATTERY

[75] Inventors: Stanford R. Ovshinsky, Bloomfield Hills; Rosa Young, Troy, both of Mich.

[73] Assignee: Ovonic Battery Company, Inc., Troy, Mich.

[21] Appl. No.: 213,788

[22] Filed: Mar. 16, 1994

[51] Int. Cl.$^5$ .................. H01M 4/36; H01M 10/24
[52] U.S. Cl. ................... 429/101; 429/206; 429/209; 429/218
[58] Field of Search ............. 429/101, 59, 206, 188, 429/218, 250, 209, 57, 223, 224; 420/900

[56] References Cited

U.S. PATENT DOCUMENTS

| | | | |
|---|---|---|---|
| 4,551,400 | 11/1985 | Sapru et al. | 429/101 X |
| 4,623,597 | 11/1986 | Sapru et al. | 429/101 |
| 5,096,667 | 3/1992 | Fetcenko | 429/101 X |

*Primary Examiner*—Anthony Skapars
*Attorney, Agent, or Firm*—Marvin S. Siskind; Marc J. Luddy; David W. Schumaker

[57] ABSTRACT

A rechargeable aqueous electrolyte lithium-hydrogen ion battery. The electrodes of the lithium-hydrogen battery electrode are formed from materials which reversibly intercalate both lithium and hydrogen ions. These materials can be represented by the general formula $Li_xH_y(HOST)$, wherein HOST represents intercalation host matrices for said electrodes into which guest Li and H ions can be inserted, and x and y are the intercalation stoichiometries of lithium and hydrogen, respectively. Preferably, the intercalation host matrices of the electrodes are chosen from the group consisting of $NiO_2$, $CoO_2$, $Mn_2O_4$, $MnO_2$, $VO_2$, $V_2O_5$, $TiS_2$, $MoS_2$, $MoO_2$, $WO_3$, graphite, and electrochemical hydrogen storage metal alloy materials. Particularly useful combinations of host matrices are $Mn_2O_4$ with $VO_2$ or an electrochemical hydrogen storage metal alloy material and $NiO_2$ with graphite or an electrochemical hydrogen storage metal alloy material.

19 Claims, No Drawings

AQUEOUS LITHIUM-HYDROGEN ION RECHARGEABLE BATTERY

FIELD OF THE INVENTION

The present invention relates generally to aqueous-electrolyte rechargeable batteries and more specifically to rechargeable aqueous electrolyte batteries having an electrochemistry involving both hydrogen ions and lithium ions.

BACKGROUND OF THE INVENTION

Rechargeable batteries are used in almost every aspect of daily life. A wide variety of industrial, commercial and consumer applications exist. Larger capacity battery uses include such applications as fork lifts, golf carts, uninterruptable power supplies for protection of electronic data storage, and even energy storage for power production facilities. When electric vehicles are manufactured in mass, demand for low weight, high charge capacity batteries will be greater than ever before. Indeed, to make mass use of electric vehicles economically feasible, very high specific capacity may be critically necessary.

In electric vehicles, weight is a significant factor. Because a large component of the total weight of the vehicle is the weight of the batteries, reducing the weight of the cells is a significant consideration in designing batteries to power electric vehicles.

The 1998 California Clean Air Act has posed an exceptional challenge on battery scientists and engineers to develop an improved battery that can support the commercialization of electric vehicles (EV). Needless to say, the law has not changed the reality of battery technology. In over 100 years of rechargeable battery usage, two chemistries namely: Pb—PbO$_2$ (known as lead-acid battery) and Cd—NiOOH (known as Ni—Cd battery) have dominate with more than 90% of the market. Neither of the two are likely to fulfill the utopian goals of powering an electric car that will match the range, economy, and performance of an internal combustion engine vehicle. Therefore, battery scientists and engineers are forced to study new battery chemistries.

In addition to industrial, commercial and other large scale uses of batteries, there are literally thousands of consumer applications of rechargeable batteries. A rechargeable electrochemical cell is ideally suited to serve as a portable power source due to its small size, light weight, high power capacity and long operating life. A rechargeable cell may operate as an "install and forget" power source. With the exception of periodic charging, such a rechargeable cell typically performs without attention and rarely becomes the limiting factor in the life of the device it powers.

Present rechargeable battery systems can be classified into two groups those employing liquid electrolytes and those employing solid electrolytes. Liquid electrolyte systems have been around for many decades and are the most well known to the general public. Examples of liquid electrolyte rechargeable battery systems include lead-acid, nickel cadmium, and the more recent nickel-metal hydride systems.

A more recent advancement is the solid electrolyte rechargeable battery systems. The solid electrolyte devices have several distinct advantages over those based on liquid electrolytes. These include (1) the capability of pressure-packaging or hard encapsulation to yield extremely rugged assemblies, (2) the extension of the operating temperature range since the freezing and/or boiling-off of the liquid phase, which drastically affect the device performance when employing liquid electrolytes are no longer a consideration, (3) solid electrolyte devices are truly leak-proof, (4) they have long shelf life due to the prevention of the corrosion of electrodes and of loss of solvent by drying out which occur when using liquid electrolytes, (5) solid electrolytes permit micro-miniaturization, and (6) the do not require heavy, rigid battery cases which are essentially "dead weight" because they provide no additional capacity to the battery but must be included in the total weight thereof.

All of the above considerations have led to a growing use of solid electrolytes. Solid state batteries and timers are already available which employ the solid electrolyte as a cylindrical pellet with suitable electrodes on either side. However, this kind of geometry leads to somewhat poor solid-solid contacts and these devices tend to have high internal resistances and polarization losses. These problems have been overcome by the use of thin films as the electrolytes, since thin films deposited on top of each other have excellent contacts and should also be able to withstand shocks, acceleration forces and spin rates without undue damage.

In forming such a battery system, a solid ion conductor (i.e. solid electrolyte) for moving ions within the system is required. A solid electrolyte is classified by its type of movable ion, such as $Li^+$-conductive solid electrolyte, $Ag^+$-conductive solid electrolyte, $Cu^+$-conductive solid electrolyte, $H^+$-conductive solid electrolyte, etc. A solid electrochemical element is constituted by combining one of these solid electrolytes with an appropriate electrode material. Several solid electrolytes are known to exhibit good ionic conductivity, some of which exist in the form of thin films. Oxide ion conductors such as zirconia are operated at high temperatures due to their low conductivity at ambient temperatures. Chloride ion conductors such as $PbCl_2$ and $BaCl_2$ have similar temperature restrictions. Silver ion such as AgBr, AgCl, and AgI also show low room temperature ionic conductivity.

Of the thin-film, solid state battery systems, lithium-polymer batteries have received the most widespread interest. Reports in 1979 that lithiated poly-ethylene-oxide (PEO) possesses lithium ion conductivity raised the expectations for a solid state battery employing PEO as solid electrolyte. Indeed, if PEO, or other polymers, were a true solid electrolyte with practical ionic conductivities and a cationic transfer number of 1, a stable interface with the lithium electrode and good charging uniformity could be realized. The expectations, no doubt, were stimulated by the relative success of the true solid electrolyte "B" Alumina, in the Sodium Sulphur battery.

More recently, several researchers proposed the use of "plasticized polymers" to enhance conductivity at room temperature. Although the term "plasticized polymers" is the correct material science terminology for the materials, they are in effect no different than a battery separator filled with organic solvent and electrolyte. In this case, we are back to liquid filled systems with all the old unsolved fundamental problems and several new ones.

Solid electrolytes consist of solid atomic structures which selectively conduct a specific ion through a network of sites in a two or three dimensional matrix. If the activation energy for mobility is sufficiently low, the solid electrolyte can serve as both the separator and electrolyte in a battery. This can allow one to fabricate an all solid state cell.

An important aspect of such electrolytes is that they selectively conduct only one type of ion. If that ion features reversible electrochemistry with both the positive and negative electrode of the battery, and if the solid electrolyte itself is inert to the electrodes, the cell will enjoy a uniform and reversible electrochemistry with no composition change and no passivation or side reactions.

While true solid electrolyte lithium conductors would not exhibit the inherent problems of Li-polymer systems described herein below, all polymer electrolytes reported to date are not true solid electrolytes. The conductivity occurs in an amorphous zone that conducts anions better than it conducts lithium ions (the transfer number of lithium is less than 0.5). As such, ion concentrations in the electrode surface are variable and irreversible reactions between the anion and the lithium electrodes do occur. The combination of the two effects brings about partial passivation of the lithium surface with non uniform dendritic plating on charge. Additionally, the conductivity of the polymer electrolyte is too low, typically two to four orders of magnitude lower than that of aqueous electrolyte. Also, the electrode area required for a 20 kwh battery is 42 $m^2$ for Ni—Cd batteries and is 1610 $m^2$ for Li-Polymer batteries. This data clearly conveys that in order to deliver acceptable power levels for EV applications, lithium polymer batteries will require nearly two orders of magnitude, larger electrode area per ampere hour than a higher power density Ni—Cd battery. Given that electrode processing is the most expensive component in battery production and that the cost of electrode processing is nearly linear with electrode area, the cost implications of the design are astonishing.

In addition to cost, safety of Li batteries, particularly liquid electrolyte systems, is always a problem. The single most important reason rechargeable lithium batteries have not been successful in the market place is their poor safety record. Most research groups that have worked on rechargeable lithium cells have "personally experienced" explosions, and explosions have occurred in the field. The problem can be diagnosed as follows: 1) lithium plating is dendritic, 2) dendrites eventually short through the separator, 3) shorted cells heat up during charging, 4) shorted cells will go into reversal during full battery discharge, 5) low capacity cells will go into reversal during full battery discharge, 6) in reversal, lithium is likely to plate on the cathode which can cause direct chemical reaction between cathode material and lithium, 7) processes 3 and 6 can generate enough heat to melt lithium (165 Centigrade), and 8) molten lithium is an extremely strong reducing agent which will react with most organic and inorganic materials. An explosion could occur depending on: (a) the amount of lithium in the cell, (b) the surface to volume aspect ratio of the cell, (c) the reactivity of the other cell components to lithium, (d) the vapor pressure of the products, and (e) the vent design.

Battery design should be aimed at minimizing the risk of lithium melt down. Given that it is extremely unlikely that lithium melt down can be completely avoided in mass usage of large rechargeable lithium batteries, it is essential to guarantee non explosion when the melt down does occur. Dry polymer electrolyte offers some improvement with regard to exposition when compared to high vapor pressure liquid electrolyte. However, that improvement is counteracted by the need for a very thin separator. Overall, the likelihood of ensuring explosion free melt downs in large cells and batteries is diminutive.

Cells utilizing polymer electrolytes that contain organic solvents, are as likely to be explosive as cells with standard (polymeric) separator and liquid electrolytes. In this case, depending on cell design, common experience places the explosion threshold in the 0.5 to 5 Ah size range; two orders of magnitude smaller than what is required for an EV battery. It should be noted that a cycled lithium electrode is more prone to explosion than a fresh uncycled one. While this fact has been known for quire some time, lithium polymer battery developers have shied away from publishing safety test data on cycled cells.

In spite of its safety problems, there is a continued interest in lithium batteries because of their purportedly high power density. This feature makes rechargeable lithium batteries attractive. Theoretical energy densities of most rechargeable lithium chemistries are two and a half to three times higher than that of Pb-Acid and Ni—Cd batteries. Indeed, liquid electrolyte rechargeable lithium batteries could be made to deliver up to 150 Wh/Kg and 200 Wh/liter. This is about three times higher than the practical gravimetric energy density delivered by the best Ni—Cd batteries and four times higher than the practical gravimetric energy density delivered by the best Pb-Acid batteries. However, the design of the lithium polymer batteries, driven by the poor conductivity of the polymer electrolyte, is very volume inefficient. Specifically, the separator occupies 30% of the stack volume, carbon is added to the positive electrode in concentration of up to 30% and the positive electrode utilization is poor. Thus, the practical energy density is likely to be considerably lower than of what can be achieved with liquid electrolyte. Estimated deliverable energy density of lithium polymer batteries is 15–20% of the theoretical energy density. This translates to (using 485 Wh/Kg as theoretical maximum) approximately 70 to 100 Wh/Kg at best. Most likely, compromises that will have to be made to improve manufacturability, safety and cycle life beyond the current laboratory state-of-the-art technology. This will have the effect to reduce the practical energy density to even below the values proposed above. The power capability of a battery depends upon the physical and chemical properties of the cell components as well as the cell design. Lithium polymer battery developers are trying to counteract the poor inherent conductivity of the polymer electrolytes by reducing the electrode and separator thickness. Because practical manufacturing reality is likely to impose increases in the electrolyte thickness from approximately 2 to 4 mil, the power deliverable by the cell is likely to drop by 30 to 50%.

An area that requires closer attention is power degradation over life. The main degradation mechanism of the cell involves irreversible reactions between lithium and electrolyte. This reduces the conductivity of the electrolyte as well as increases the impedance of the Lithium electrode due to the formation of passive films; both effects reduce the deliverable power from the battery. Because the cycle life of the lithium polymer battery is short, significant degradation in power is likely to occur in less than 100 cycles.

Other problems arise from real life usage and requirements placed upon battery systems. Traction batteries are assembled from a string of individual cells connected in series. During both charge and discharge, the same amount of current will pass through all the cells. In practical manufacturing and usage, it is impossible to keep all cells at exactly the same state of charge. This forces a weak cell in a battery to go into reverse during deep discharge and some cells to go into overcharge during full charge. For a battery to operate at deep discharge cycles, it is essential that individual cells tolerate reverse or overcharge without damage or safety implications.

Lithium batteries are very poor in this respect. Over discharge will result in plating lithium on the positive electrode which can result in a spontaneous chemical reaction with severe safety implications. Overcharge is likely to result in electrolyte degradation that can generate some volatile gasses as well as increase cell impedance. These problems are particularly severe for lithium cells because: 1) degradation occurs during cycle life, therefore, even if initial capacities are matched very closely, it is unreasonable to expect that the degradation rate will be identical for all cells, 2) the cells tend to develop soft or hard shorts, thereby making it impossible to maintain the cells at the same state of charge at all times, and 3) cell capacity is dependent on temperature, therefore cells that are physically cooler due to their location will deliver less capacity than others. These conditions make the likelihood of cell reversal, relatively early in the life of the battery, very high. Of course, cell reversal is likely to result in venting and or explosion.

It has been propose to install individual diode protection for all cells which could be an expensive, although practical, solution for a portable low watt-hour battery. The increased cost and reduced reliability associated with this solution makes this very undesirable for an EV battery. Plus, the inherent lack of overcharge and over discharge capability eliminates any possibility of ever developing a rechargeable lithium-polymer battery of a bipolar design.

An additional problem with the commercialization of Li-polymer batteries is their high cost. It is difficult to assess the cost, although clearly, processing cost per watt-hour should be much higher than that of traditional batteries. Raw material costs are clearly higher than Pb-Acid, although, it may be similar to Ni—Cd. The cost of raw material will rise due to high purity requirements. There are convincing reasons to expect that lithium polymer batteries, if ever made commercially, will be considerably more expensive than Ni—Cd batteries considering that: 1) primary Li—M-nO$_2$ cells, which are in mass production, are still more expensive than Ni—Cd cells, 2) the purity requirements for a secondary cell are much higher than that of a primary cell, and 3) the electrode area per watt-hour of a lithium polymer secondary battery will be approximately an order of magnitude larger than that of a primary Li-MnO$_2$ battery.

Even more problematic than the cost factor is the low cycle life of the lithium polymer batteries, which is particularly important in EV applications. Small rechargeable lithium batteries employing organic liquid electrolyte have delivered 100 to 400 cycles in laboratory tests. It is anticipated that lithium polymer electrolyte batteries of the same size could be made to deliver a comparable number of cycles. However, all the data published to date on lithium polymer batteries was run on cells with a very large amount of excess lithium, therefore, no conclusion can be drawn at this stage.

The cycle life of a large multi cell battery is likely to be considerably lower than that of a small two-cell battery. Additional reduction of the expected cycle life results from consideration of the fact that the battery will be limited by the weakest cell, and as previously mentioned, the likelihood of temperature or electrical imbalance is high. Further, power may degrade faster than capacity, so cycle life could become limited due to an unacceptable drop in power. Therefore, it is probably a fair assumption that if a full size battery was built at today's state-of-the-art technology, it could possibly make 100 cycles or so, which is about an order of magnitude short of what is required for an EV.

Therefore, since lithium-polymer batteries will be inadequate to meet today's requirements for a universally acceptable, rechargeable secondary battery system, other systems need to be developed. The aqueous lithium-hydrogen battery systems of the present invention meet the requirements discussed hereinabove.

A brief discussion of prior art aqueous hydrogen battery technology will now be useful, as the present invention employs this technology to some extent.

Metal hydride negative electrode materials were originally classified as AB2 based material or AB5 (mischmetal) based materials. Modern metal hydride negative electrode materials are all multiphase multicomponent materials often referred to as Ovonic materials. These materials are discussed in detail in U.S. patent application Ser. No. 07/934,976, now U.S. Pat. No. 5,277,999 to Ovshinsky and Fetcenko, the contents of which are incorporated by reference.

The first hydrogen storage alloys to be investigated as battery electrode materials were TiNi and LaNi5. Many years were spent in studying these simple binary intermetallics because they were known to have the proper hydrogen bond strength for use in electrochemical applications. Despite extensive efforts, however, researchers found these intermetallics to be extremely unstable and of marginal electrochemical value due to a variety of problems such as slow discharge, oxidation, corrosion, poor kinetics, poor catalysis, and poor cycle life. The initial use of these simple alloys for battery applications reflect the traditional bias of battery developers toward the use of single element couples of crystalline materials such as NiCd, NaS, LiMS, ZnBr, NiFe, NiZn, and Pb-acid. In order to improve the electrochemical properties of the binary intermetallics while maintaining the hydrogen storage efficiency, early workers began modifying TiNi and LaNi5 systems.

The modification of TiNi and LaNi5 was initiated by Stanford R. Ovshinsky at Energy Conversion Devices (ECD) of Troy, Mich. Upon a detailed investigation, Ovshinsky and his team at ECD showed that reliance on simple, relatively pure compounds was a major shortcoming of the prior art. Prior work had determined that catalytic action depends on surface reactions at sites of irregularities in the crystal structure. Relatively pure compounds were found to have a relatively low density of hydrogen storage sites, and the type of sites available occurred accidentally and were not designed into the bulk of the material. Thus, the efficiency of the storage of hydrogen and the subsequent release of hydrogen to form water was determined to be substantially less than that which would be possible if a greater number and variety of active sites were available. By engineering a disordered material having an ordered local environment, the entire bulk of the material can be provided with catalytically active hydrogen storage sites. Ovshinsky had previously found that the number of surface sites could be increased by making an amorphous film that resembled the surface of the desired relatively pure materials. See, Principles and Applications of Amorphicity, Structural Change, and Optical Information Encoding, 42 Journal De Physique at C4-1096 (October 1981).

Thus, rather than searching for material modifications that would yield ordered at materials having a maximum number of accidentally occurring surface irregularities, Ovshinsky and his team at ECD began constructing "disordered" materials where the desired irregularities were synthetically engineered and tailor made. See, U.S. Pat. No. 4,623,597, the disclosure of which is incorporated by reference. The term "disordered," as used herein corresponds to the meaning of the term as used in the literature, such as the following:

> [Disordered material] can exist in several structural states. This structural factor constitutes a new variable with which the physical properties of the [material] . . . can be controlled. Furthermore, structural disorder opens up the possibility of preparing in a metastable state new compositions and mixtures that far exceed the limits of thermodynamic equilibrium. Hence, we note the following as a further distinguishing feature. In many disordered [materials] . . . it is possible to control the short-range order parameter and thereby achieve drastic changes in the physical properties of these materials, including forcing new coordination numbers for elements . . . S. R. Ovshinsky, The Shape of Disorder, 32 Journal of Non-Crystalline Solids at 22 (1979).

The "short-range order" of disordered materials is explained further by Ovshinsky in The Chemical Basis of Amorphicity: Structure and Function, 26:8–9 Rev. Roum. Phys. at 893–903 (1981):

> [S]hort-range order is not conserved . . . . Indeed, when crystalline symmetry is destroyed, it becomes impossible to retain the same short-range order. The reason for this is that the short-range order is controlled by the force fields of the electron orbitals. Therefore, the environment must be fundamentally different in corresponding crystalline and amorphous solids. In other words, it is the interaction of the local chemical bonds with their surrounding environment which determines the electrical, chemical, and physical properties of the material, and these can never be the same in amorphous materials as they are in crystalline materials . . . . The orbital relationships that can exist in three-dimensional space in amorphous but not crystalline materials are the basis for new geometries, many of which are inherently anti-crystalline in nature. Distortion of bonds and displacement of atoms can be an adequate reason to cause amorphicity in single component materials. But to sufficiently understand the amorphicity, one must understand the three-dimensional relationships inherent in the amorphous state, for it is they which generate internal topology incompatible with the translational symmetry of the crystalline lattice . . . . What is important in the amorphous state is the fact that one can make an infinity of materials that do not have any crystalline counterparts, and that even the ones that do are similar primarily in chemical composition. The spatial and energetic relationships of these atoms can be entirely different in the amorphous and crystalline forms, even though their chemical elements can be the same . . .

Short-range, or local, order is elaborated on in U.S. Pat. No. 4,520,039 to Ovshinsky, entitled Compositionally Varied Materials and Method for Synthesizing the Materials, the contents of which are incorporated by reference. This patent discusses how disordered materials do not require any periodic local order and how, by using Ovshinsky's techniques, spatial and orientational placement of similar or dissimilar atoms or groups of atoms is possible with such increased precision and control of the local configurations that it is possible to produce qualitatively new phenomena. In addition, this patent discusses that the atoms used need not be restricted to "d band" or "f band" atoms, but can be any atom in which the controlled aspects of the interaction with the local environment plays a significant role physically, electrically, or chemically so as to affect the physical properties and hence the functions of the materials. These techniques result in means of synthesizing new materials which are disordered in several different senses simultaneously.

By forming metal hydride alloys from such disordered materials, Ovshinsky and his team were able to greatly increase the reversible hydrogen storage characteristics required for efficient and economical battery applications, and produce batteries having high density energy storage, efficient reversibility, high electrical efficiency, bulk hydrogen storage without structural change or poisoning, long cycle life, and deep discharge capability. These materials are discussed in detail in U.S. Pat. No. 4,623,597, the contents of which are incorporated by reference.

The improved characteristics of these alloys result from tailoring the local chemical order and hence the local structural order by the incorporation of selected modifier elements into a host matrix. Disordered metal hydride alloys have a substantially increased density of catalytically active sites and storage sites compared to conventional ordered materials. These additional sites are responsible for improved efficiency of electrochemical charging/discharging and an increase in electrical energy storage capacity. The nature and number of storage sites can even be designed independently of the catalytically active sites. More specifically, these disordered multi-component alloys are thermodynamically tailored to allow storage of hydrogen atoms at a wide range of modulated bonding strengths within the range of reversibility suitable for use in secondary battery applications.

Based on these principles of disordered materials, described above, a family of extremely efficient electrochemical hydrogen storage materials were formulated. These are the Ti—V—Zr—Ni type active materials such as disclosed in U.S. Pat. No. 4,551,400. The materials of the '400 Patent are generally multiphase materials, which may contain, but are not limited to, one or more phases of Ti—V—Zr—Ni material with C14 and C15 type crystal structures. Other Ti—V—Zr—Ni alloys may also be used for fabricating rechargeable hydrogen storage negative electrodes. One such family of materials are those described in U.S. Pat. No. 4,728,586 ("the '586 Patent") to Venkatesan, Reichman, and Fetcenko for Enhanced Charge Retention Electrochemical Hydrogen Storage Alloys and an Enhanced Charge Retention Electrochemical Cell, the disclosure of which is incorporated by reference. The '586 Patent describes a specific sub-class of these Ti—V—Ni—Zr alloys comprising Ti, V, Zr, Ni, and a fifth component, Cr. The '586 patent, mentions the possibility of additives and modifiers beyond the Ti, V, Zr, Ni, and Cr components of the alloys, and generally discusses specific additives and modifiers, the amounts and interactions of these modifiers, and the particular benefits that could be expected from them.

The V—Ti—Zr—Ni family of alloys described in the '586 Patent has an inherently higher discharge rate capability than previously described alloys. This is the result of substantially higher surface areas at the metal/electrolyte interface for electrodes made from the V—Ti—Zr—Ni materials. The surface roughness factor (total surface area divided by geometric surface area) of the V—Ti—Zr—Ni is about 10,000. This value indicates a very high surface area. The validity of this value is supported by the inherently high rate capability of these materials.

The characteristic surface roughness of the metal electrolyte interface is a result of the disordered nature of the material. Since all of the constituent elements, as well as many alloys and phases of them, are present throughout the metal, they are also represented at the surfaces and at cracks which form in the metal/electrolyte interface. Thus, the characteristic surface roughness is descriptive of the interaction of the physical and chemical properties of the host metals as well as of the alloys and crystallographic phases of the alloys, in an alkaline environment. The microscopic chemical, physical, and crystallographic parameters of the individual phases within the hydrogen storage alloy material are believed to be important in determining its macroscopic electrochemical characteristics.

In addition to the physical nature of its roughened surface, it has been observed that V—Ti—Zr—Ni alloys tend to reach a steady state surface condition and particle size. This steady state surface condition is characterized by a relatively high concentration of metallic nickel. These observations are consistent with a relatively high rate of removal through precipitation of the oxides of titanium and zirconium from the surface and a much lower rate of nickel solubilization. The resultant surface seems to have a higher concentration of nickel than would be expected from the bulk composition of the negative hydrogen storage electrode. Nickel in the metallic state is electrically conductive and catalytic, imparting these properties to the surface. As a result, the surface of the negative hydrogen storage electrode is more catalytic and conductive than if the surface contained a higher concentration of insulating oxides.

The surface of the negative electrode, which has a conductive and catalytic component —the metallic nickel—appears to interact with chromium alloys in catalyzing various hydride and dehydride reaction steps. To a large extent, many electrode processes, including competing electrode processes, are controlled by the presence of chromium in the hydrogen storage alloy material, as disclosed in the '586 Patent.

Simply stated, in the AB5 alloys, like the V—Ti—Zr—Ni alloys, as the degree of modification increases, the role of the initially ordered base alloy is of minor importance compared to the properties and disorder attributable to the particular modifiers. In addition, analysis of the current multiple component AB5 alloys indicates that current AB5 alloy systems are modified following the guidelines established for V—Ti—Zr—Ni based systems. Thus, highly modified AB5 alloys are identical to V—Ti—Zr—Ni based alloys in that both are disordered materials that are characterized by multiple-components and multiple phases and there no longer exists any significant distinction between multi-component, multiphase V—Ti—Zr—Ni based alloys and AB5 alloys.

In rechargeable alkaline cells using a nickel hydroxide positive electrode, the nickel hydroxide changes back and forth between Ni(OH)2 and NiOOH as the cell is charged and discharged. Bode, et al., described the relationship between the different structural phases that occur in such an electrode as presented in 11 Electrochem. Acta 1079 (1966). These structures represent plates of crystallized nickel hydroxide positive electrode material held in position by a variety of ionic species. In unmodified nickel hydroxide electrode materials cycling occurs from the beta-(II)phase and the beta-(III) phase structures because they are the most stable. During such cycling one electron is transferred. The theoretical specific capacity of the nickel hydroxide active material based on this reaction is 289 mAh/g.

In contrast to beta phase cycling, alpha-gamma phase cycling appears to involve the transfer of at least 1.5 electrons. (See, for example, Oliva et al., 8 J. Power Sources 229 (1982)). Multiple electron transfer materials having increased cell capacity are described in detail in U.S. patent application Ser. No. 08/027,973 (the contents of which are incorporated by reference). These materials exhibit a 1.7 electron oxidation with a nickel valence of 3.67 according to equation.

SUMMARY OF THE INVENTION

The instant invention is a rechargeable aqueous electrolyte lithium-hydrogen battery. The lithium-hydrogen battery includes a battery a battery case, at least one set of electrochemical cell electrodes placed in said case, a separator material disposed between the electrodes, the separator material being electrically insulating and capable of readily conducting or transporting both lithium ions and hydrogen ions therethrough and an aqueous electrolyte disposed within the case and surrounding and wetting the electrodes and the separator, the aqueous electrolyte readily capable of transporting or conducting both lithium ions and hydrogen ions therethrough.

The set of electrodes includes a negative electrode formed from material capable of electrochemically adsorbing and desorbing both lithium ions and hydrogen ions during charge and discharge thereof, respectively and a positive electrode formed from material capable of electrochemically desorbing and adsorbing both lithium ions and hydrogen ions during charge and discharge thereof, respectively.

The electrodes are formed from materials which reversibly intercalate both lithium and hydrogen ions. These materials can be represented by the general formula $Li_xH_y(HOST)$, wherein HOST represents intercalation host matrices for said electrodes into which guest Li and H ions can be inserted, and x and y are the intercalation stoichiometries of lithium and hydrogen, respectively.

Preferably, the intercalation host matrices of the electrodes are chosen from the group consisting of $NiO_2$, $CoO_2$, $Mn_2O_4$, $MnO_2$, $VO_2$, $V_2O_5$, $TiS_2$, $MoS_2$, $MoO_2$, $WO_3$, graphite, and electrochemical hydrogen storage metal alloy materials.

Particularly useful combinations of host matrices are $Mn_2O_4$ with $VO_2$ or an electrochemical hydrogen storage metal alloy material and $NiO_2$ with graphite or an electrochemical hydrogen storage metal alloy material.

DETAILED DESCRIPTION OF THE INVENTION

The instant invention comprises an aqueous electrolyte rechargeable intercalation battery. The battery includes a battery case and at least one set of electrochemical cell electrodes placed in said case. The set of electrodes includes a negative electrode forced from a material capable of electrochemically intercalating and deintercalating both lithium ions and hydrogen ions during charge and discharge thereof, respectively and a positive electrode formed from material capable of electrochemically deintercalating and intercalating both lithium ions and hydrogen ions during charge and discharge thereof, respectively. A separator, formed from a material which is electrically insulating and capable of readily conducting or transporting both lithium ions and hydrogen ions therethrough, is disposed between the positive electrode and the negative electrode. Finally, an aqueous electrolyte is disposed within the case. The electrolyte is readily capable of transporting or conducting both lithium ions and hydrogen ions themthrough and surrounds and wets the electrodes and the separator.

In the present battery, the electrodes are formed from materials which are readily capable of intercalating and deintercalating both lithium and hydrogen ions during charge and discharge. The operation of these electrodes is based upon the ability of the electrode materials to reversibly intercalate lithium and hydrogen. Intercalation is the reversible electrochemical insertion of a "guest" atoms (such as Li and/or H) into a "host" solid matrix (such as $V_2O_5$, $VO_2$, $MnO_2$ or $Mn_2O_4$ etc.) accompanied by insignificant, reversible structural changes to the host matrix. Hosts for intercalation are commonly layered compounds like graphite or tunnel compounds like $MnO_2$, where the intercalated Li and H ions reside between the layers or within the tunnels of these materials. Intercalation of Li and H ions occurs because the chemical potential thereof can be lowered when they are inserted into the host matrix, thus forming a type of chemical bond. Since Li and H can be added and removed from these electrode materials, it is useful to designate them as $(Li-H)_x(HOST)$, the subscript x being used to measure the guest atom stoichiometries. More specifically they can be designated as $Li_xH_y(HOST)$. Where x and y are the stoichiometries of lithium and hydrogen in the host material and may be independent from one another or interdependent. The lithium-hydrogen intercalation batteries of the present invention use two different intercalation hosts as the positive and negative electrodes. For example, a cell may consist of $LiHMn_2O_4$ as the positive electrode and $VO_2$ as the negative electrode. Therefore, the electrode reactions would be as follows:

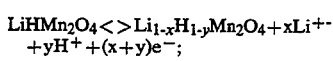

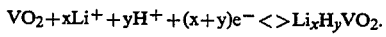

Another example of a lithium-hydrogen aqueous battery of the present invention is a $LiNiO_2H_xC$ battery. This battery can be described as a half-charged battery. That is, initially the positive electrode is $LiNiO_2$ and the negative electrode is hydrogenated carbon (such as graphite). The "as deposited" cell is in a half charged state. During formation (i.e. full charging) hydrogen ions are transferred to the lithium nickelate material according to the following reactions:

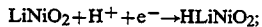

and

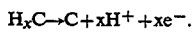

The subsequent discharge reactions (i.e. to full discharge) are as follows.

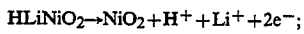

and

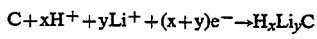

A purely exemplary, non-exhaustive list of materials useful as electrode HOST materials (i.e. intercalated Li and H are not shown) for the aqueous lithium-hydrogen battery of the instant invention includes: $NiO_2$, $CoO_2$, $Mn_2O_4$, $MnO_2$, $VO_2$, $V_2O_5$, $TiS_2$, $MoS_2$, $MoO_2$, $WO_3$, graphite and electrochemical hydrogen storage metal alloy materials typically used in nickel-metal hydride batteries for intercalation of hydrogen, etc.

The electrochemical hydrogen storage metal alloy materials may be any of those already known any used in nickel-metal hydride batteries. These materials may be $AB_2$ or $AB_5$ type metal hydride materials. They may be amorphous, polycrystalline, microcrystalline, nanocrystalline, single crystal or multi-structural materials. They may include only a single compositional phase or may include multiple compositional phases. An extensive review of the known metal hydride materials useful in electrochemical cells is given in U.S. Pat. No. 5,096,667 the disclosure of which is incorporated herein by reference.

An example of an aqueous lithium-hydrogen battery using a metal-hydride type of electrode is a $LiNiO_2$-$H_xM$ battery wherein M is an electrochemical hydrogen storage metal alloy material. This is another example of an as deposited "half charged" battery. The initial charging reactions are:

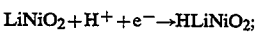

and

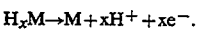

The subsequent discharge reactions (i.e. to full discharge) are as follows:

and

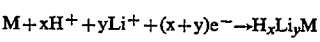

While any two host materials can be used for the positive and negative electrode materials, consideration must be given to certain factors regarding the practical choice of materials. Particularly useful combinations would be $Mn_2O_4$ with $VO_2$ or an electrochemical hydrogen storage metal alloy material and $NiO_2$ with graphite or an electrochemical hydrogen storage metal alloy material.

One such consideration is half cell voltages. Clearly, the electrode materials must be chosen such that the half cell voltages differ enough that the full cell will have a useful final voltage. For example, choice of electrode materials which have half cell voltages of $-0.5$ volts and $+1.0$ volts relative to a standard hydrogen electrode will give a full cell voltage of 1.5 volts, a useful voltage. However, if the electrode materials are chosen such that they have half cell voltages of 1.3 volts and 1.5 volts, the battery will have a full cell voltage of only 0.2 volts, not a particularly useful voltage. Also to be noted is the fact that the full cell voltage is limited to that voltage at which the electrolyte solvent, water, begins to decompose into molecular hydrogen and oxygen. This "overvoltage" can destroy the cell completely. Therefore, choice of correct half cell voltages is an important consideration when choosing electrode host materials.

Another consideration is the reactivity of the guest atoms with the aqueous electrolyte, particularly for the lithium ions. When a lithium intercalation compound is put into water, one must consider whether the following reaction will occur:

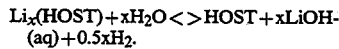
$$Li_x(HOST) + xH_2O \lessgtr HOST + xLiOH\text{-}(aq) + 0.5xH_2.$$

This typically occurs when the binding energy in the HOST materials is insufficient to keep atomic lithium from spontaneously reacting with the water in the electrolyte. Therefore, the electrode material must be chosen to bind lithium with an energy great enough to prevent reaction with water to form LiOH and $H_2$. Another aspect of this consideration is that the lithium reaction with water to form LiOH is driven to the left when the electrode is placed in concentrated Li ion solutions such as an aqueous electrolyte. This allows use of electrode materials which could not have been ordinarily used in aqueous solutions which do not contain sufficient Li ions.

A further consideration in choosing the electrode HOST materials is the ability of the HOST material to be charged with hydrogen and the method required for charging the HOST with hydrogen. Since many of the HOST materials will not be capable of being directly fabricated with hydrogen incorporated thereinto, one of the electrodes will need to be hydrogenated before the cell is assembled. This hydrogenation may occur in a hydrogenation chamber, such as a microwave plasma chamber, where powdered HOST materials is exposed to a hydrogen plasma and is thereby charged with hydrogen. Another technique is to electrochemically charge one of the HOST materials after it has been formed into an electrode. This is accomplished by performing a half cell charging reaction against a nickel electrode in an aqueous electrolyte which drives hydrogen ions into the HOST material and thereby charges the electrode.

Other factors to consider when choosing the HOST material are weight, cost and availability of the HOST material and its precursor materials. Also, the ease and cost of fabrication of the HOST material must be considered. Additionally, the charge capacity of the HOST material and its cyclability are important factors.

The electrodes can be formed by methods well known in the art of battery making. Such methods include sintering powdered material to form a monolithic electrode, sintering the powder electrode material onto an electrode baseplate, or pasting electrode powder into foamed metal mesh material which is then press rolled into an electrode. The materials can also be deposited by methods such as physical vapor deposition (PVD), sputtering, evaporation, chemical vapor deposition (CVD), glow discharge, microwave plasma enhanced CVD, sol-gel formation techniques such as sol-gel pyrolysis and others.

The separator material used in the batteries of the instant invention should be electrically insulating to prevent electrical shorting between the positive and negative electrodes. Also, the separator material should readily conduct or transport both lithium ions and hydrogen ions. The separator should be chemically inert to the materials of the battery and the lithium and hydrogen ions. This separator material can be any of the known materials used by the prior art as long as the material is inert to the aqueous electrolyte and other battery chemicals. Typically the separators are formed from woven or matted polymer fiber sheet material such as microporous polypropylene sheet material with a wetting agent incorporated thereinto, or a microporous nylon sheet material.

The electrolyte is an aqueous solution which is readily capable of transporting both lithium and hydrogen ions. This material is preferably an aqueous solution of at least one soluble lithium salt such as lithium nitrate or lithium hydroxide.

The battery case can be formed from typical battery case materials used in the prior art such as light weight polymer materials, stainless steel, nickel or combinations thereof.

It is to be understood that the disclosure set forth herein is presented in the form of detailed embodiments described for the purpose of making a full and complete disclosure of the present invention, and that such details are not to be interpreted as limiting the true scope of this invention as set forth and defined in the appended claims.

We claim:

1. A rechargeable aqueous electrolyte lithium-hydrogen ion battery comprising:
   a) a battery case;
   b) at least one set of electrochemical cell electrodes placed in said case, said set of electrodes including:
      i) a negative electrode formed from material capable of electrochemically adsorbing and desorbing both lithium ions and hydrogen ions during charge and discharge thereof, respectively; and
      ii) a positive electrode formed from material capable of electrochemically desorbing and adsorbing both lithium ions and hydrogen ions during charge and discharge thereof, respectively;
   c) a separator material disposed between said positive electrode and said negative electrode, where said separator material is electrically insulating and capable of readily conducting or transporting both lithium ions and hydrogen ions therethrough; and
   d) an aqueous electrolyte disposed within said case and surrounding and wetting said electrodes and said separator, said aqueous readily capable of transporting or conducting both lithium ions and hydrogen ions therethrough.

2. An aqueous lithium-hydrogen ion battery as in claim 1, wherein said positive electrodes and said negative electrodes are formed from materials which reversibly intercalate both lithium and hydrogen ions, said materials having the general formula $Li_xH_y(HOST)$, wherein HOST represents intercalation host matrices for said electrodes into which guest Li and H ions have been inserted and x and y are the intercalation stoichiometries of lithium and hydrogen, respectively.

3. An aqueous lithium-hydrogen ion battery as in claim 2, wherein said intercalation host matrices of said electrodes are chosen from the group consisting of $NiO_2$, $CoO_2$, $Mn_2O_4$, $MnO_2$, $VO_2$, $V_2O_5$, $TiS_2$, $MoS_2$, $MoO_2$, $WO_3$, graphite, and electrochemical hydrogen storage metal alloy materials.

4. An aqueous lithium-hydrogen ion battery as in claim 3, wherein said intercalation host matrices for said electrodes are $Mn_2O_4$ and $VO_2$.

5. An aqueous lithium-hydrogen ion battery as in claim 3, wherein said intercalation host matrices for said electrodes are $NiO_2$ and graphite.

6. An aqueous lithium-hydrogen ion battery as in claim 3, wherein said intercalation host matrices for said electrodes are $NiO_2$ and an electrochemical hydrogen storage metal alloy material.

7. An aqueous lithium-hydrogen ion battery as in claim 3, wherein said intercalation host matrices for said electrodes are $Mn_2O_4$ and an electrochemical hydrogen storage metal alloy material.

8. An aqueous lithium-hydrogen ion battery as in claim 3, wherein said electrodes are pasted electrodes.

9. An aqueous lithium-hydrogen ion battery as in claim 4, wherein said electrodes are pasted electrodes.

10. An aqueous lithium-hydrogen ion battery as in claim 5, wherein said electrodes are pasted electrodes.

11. An aqueous lithium-hydrogen ion battery as in claim 6, wherein said electrodes are pasted electrodes.

12. An aqueous lithium-hydrogen ion battery as in claim 7, wherein said electrodes are pasted electrodes.

13. An aqueous lithium-hydrogen ion battery as in claim 3, wherein said electrodes are sintered electrodes.

14. An aqueous lithium-hydrogen ion battery as in claim 1, wherein said case is formed from at least one of a lightweight inert polymer material, stainless steel, or nickel.

15. An aqueous lithium-hydrogen ion battery as in claim 1, wherein said electrolyte is formed from an aqueous solution of soluble lithium salts.

16. An aqueous lithium-hydrogen ion battery as in claim 15, wherein said electrolyte is formed from an aqueous solution of at least one of lithium nitrate or lithium hydroxide.

17. An aqueous lithium-hydrogen ion battery as in claim 1, wherein said separator material is formed from woven or matted polymer fiber sheet material.

18. An aqueous lithium-hydrogen ion battery as in claim 17, wherein said separator material is formed from a microporous polypropylene sheet which incorporates a wetting agent.

19. An aqueous lithium-hydrogen ion battery as in claim 17, wherein said separator is formed from a microporous nylon sheet material.

* * * * *

Adverse Decision In Interference

Patent No. 5,376,475, Stanford R. Ovshinsky, Rosa Young, AQUEOUS LITHIUM-HYDROGEN ION RECHAREABLE BATTERY, Interference No. 103,961, final judgment adverse to the patentee rendered December 28, 2000, as to claims 1-19.

*(Official Gazette April 10, 2001)*